US011328303B2

(12) United States Patent
Hu et al.

(10) Patent No.: US 11,328,303 B2
(45) Date of Patent: May 10, 2022

(54) ASSET TRANSFER METHOD AND APPARATUS, AND ELECTRONIC DEVICE

(71) Applicant: Advanced New Technologies Co., Ltd., Grand Cayman (KY)

(72) Inventors: Danqing Hu, Hangzhou (CN); Sen Lin, Shanghai (CN); Junliang Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/424,991

(22) Filed: May 29, 2019

(65) Prior Publication Data

US 2019/0370809 A1 Dec. 5, 2019

(30) Foreign Application Priority Data

May 29, 2018 (CN) .......................... 201810533816.9

(51) Int. Cl.
*G06Q 20/40* (2012.01)
*G06Q 20/36* (2012.01)
*H04L 9/06* (2006.01)

(52) U.S. Cl.
CPC ....... *G06Q 20/405* (2013.01); *G06Q 20/3674* (2013.01); *G06Q 20/3678* (2013.01); *H04L 9/0637* (2013.01)

(58) Field of Classification Search
None
See application file for complete search history.

(56) References Cited

U.S. PATENT DOCUMENTS 8,700,476 B1 4/2014 Pienkos
10,169,757 B1 1/2019 Vippagunta et al.
(Continued)

FOREIGN PATENT DOCUMENTS

AU 2019203952 12/2019
CN 105427104 3/2016
(Continued)

OTHER PUBLICATIONS

H. Sun, H. Mao, X. Bai, Z. Chen, K. Hu and W. Yu, "Multi-Blockchain Model for Central Bank Digital Currency," 2017 18th International Conference on Parallel and Distributed Computing, Applications and Technologies (PDCAT), 2017, pp. 360-367, doi: 10.1109/PDCAT.2017.00066. (Year: 2017).*
(Continued)

*Primary Examiner* — El Mehdi Oussir
(74) *Attorney, Agent, or Firm* — Fish & Richardson P.C.

(57) ABSTRACT

An asset transfer request to transfer an asset to a blockchain member associated with a blockchain is detected, where the asset is of a specified asset type and is issued by a specified anchor in the blockchain. Whether there is a maximum trusted asset limit configured by the blockchain member for the specified anchor and that corresponds to the specified asset type is determined. If it is determined that the maximum trusted asset limit is not configured, application of the asset transfer request to the asset is prohibited. However, if it is determined that the maximum trusted asset limit is configured, whether the maximum trusted asset limit is exceeded is determined. If it is determined that the maximum trusted asset limit is not exceeded, the asset transfer request is applied to the asset.

14 Claims, 11 Drawing Sheets

(56) References Cited

U.S. PATENT DOCUMENTS

| | | | |
|---|---|---|---|
| 10,269,009 B1* | 4/2019 | Winklevoss | G06Q 20/3674 |
| 10,354,325 B1* | 7/2019 | Skala | G06Q 40/04 |
| 10,373,158 B1* | 8/2019 | James | G06Q 20/065 |
| 10,540,654 B1* | 1/2020 | James | G06Q 20/223 |
| 11,200,569 B1* | 12/2021 | James | G06Q 20/3829 |
| 2008/0167965 A1* | 7/2008 | Von Nothaus | G06Q 20/20 705/17 |
| 2009/0024527 A1 | 1/2009 | Sellen | |
| 2014/0114852 A1* | 4/2014 | Rajagopal | G06Q 30/06 705/44 |
| 2014/0364552 A1 | 12/2014 | Katakami | |
| 2015/0170112 A1* | 6/2015 | DeCastro | G06Q 20/381 705/39 |
| 2015/0262137 A1 | 9/2015 | Armstrong | |
| 2015/0271183 A1 | 9/2015 | MacGregor et al. | |
| 2015/0332283 A1 | 11/2015 | Witchey | |
| 2015/0365283 A1* | 12/2015 | Ronca | H04L 41/0816 705/71 |
| 2016/0012465 A1* | 1/2016 | Sharp | G06Q 20/386 705/14.17 |
| 2016/0092988 A1* | 3/2016 | Letourneau | G06Q 20/363 705/66 |
| 2016/0117770 A1* | 4/2016 | Graham | G06Q 40/04 705/37 |
| 2016/0203477 A1 | 7/2016 | Yang | |
| 2016/0260169 A1 | 9/2016 | Arnold et al. | |
| 2016/0275461 A1 | 9/2016 | Sprague et al. | |
| 2016/0330034 A1 | 11/2016 | Back et al. | |
| 2017/0005804 A1* | 1/2017 | Zinder | G06F 21/6254 |
| 2017/0017958 A1* | 1/2017 | Scott | G06Q 20/12 |
| 2017/0046651 A1 | 2/2017 | Lin et al. | |
| 2017/0046664 A1 | 2/2017 | Haldenby et al. | |
| 2017/0048235 A1 | 2/2017 | Lohe et al. | |
| 2017/0091756 A1* | 3/2017 | Stern | G06Q 20/367 |
| 2017/0109735 A1* | 4/2017 | Sheng | H04L 9/3297 |
| 2017/0132626 A1 | 5/2017 | Kennedy | |
| 2017/0140371 A1 | 5/2017 | Forzley et al. | |
| 2017/0154331 A1 | 6/2017 | Voorhees | |
| 2017/0221052 A1* | 8/2017 | Sheng | G06Q 20/3829 |
| 2017/0236102 A1 | 8/2017 | Biton | |
| 2017/0236104 A1 | 8/2017 | Biton | |
| 2017/0237554 A1* | 8/2017 | Jacobs | H04L 9/0819 713/171 |
| 2017/0243193 A1 | 8/2017 | Manian et al. | |
| 2017/0262778 A1* | 9/2017 | Ganesan | H04L 9/3247 |
| 2017/0330181 A1* | 11/2017 | Ortiz | G06Q 30/0226 |
| 2017/0344988 A1 | 11/2017 | Cusden et al. | |
| 2017/0331896 A1 | 12/2017 | Holloway et al. | |
| 2017/0364552 A1 | 12/2017 | Pattanaik et al. | |
| 2017/0366357 A1 | 12/2017 | Pattanaik et al. | |
| 2018/0005235 A1 | 1/2018 | Thorne | |
| 2018/0012311 A1 | 1/2018 | Small et al. | |
| 2018/0039667 A1* | 2/2018 | Pierce | G06F 16/2365 |
| 2018/0046992 A1 | 2/2018 | Hanrahan et al. | |
| 2018/0053162 A1 | 2/2018 | Janes | |
| 2018/0075536 A1 | 3/2018 | Jayaram et al. | |
| 2018/0096349 A1 | 4/2018 | McDonald et al. | |
| 2018/0101844 A1 | 4/2018 | Song et al. | |
| 2018/0101848 A1 | 4/2018 | Castagna et al. | |
| 2018/0123882 A1 | 5/2018 | Anderson et al. | |
| 2018/0144156 A1 | 5/2018 | Marin | |
| 2018/0191503 A1* | 7/2018 | Alwar | H04L 9/0637 |
| 2018/0240112 A1* | 8/2018 | Castinado | G06Q 20/3829 |
| 2018/0253727 A1* | 9/2018 | Ortiz | G06Q 20/325 |
| 2018/0293573 A1* | 10/2018 | Ortiz | G06Q 20/20 |
| 2018/0365670 A1* | 12/2018 | Dunjic | G06Q 20/204 |
| 2019/0026821 A1 | 1/2019 | Bathen et al. | |
| 2019/0052454 A1 | 2/2019 | Wright et al. | |
| 2019/0066206 A1* | 2/2019 | Marks | G06Q 20/405 |
| 2019/0108582 A1 | 4/2019 | Sebastian et al. | |
| 2019/0130399 A1 | 5/2019 | Wright et al. | |
| 2019/0165930 A1 | 5/2019 | Castinado et al. | |
| 2019/0370798 A1 | 12/2019 | Hu et al. | |
| 2019/0370807 A1 | 12/2019 | Hu et al. | |
| 2019/0370810 A1 | 12/2019 | Hu et al. | |
| 2019/0370811 A1 | 12/2019 | Zhang et al. | |
| 2020/0169546 A1* | 5/2020 | Padmanabhan | G06F 21/6245 |
| 2020/0204345 A1* | 6/2020 | Chee | H04L 9/3247 |
| 2020/0258061 A1* | 8/2020 | Beadles | G06Q 20/3678 |
| 2021/0224759 A1* | 7/2021 | Zorzano Blasco | G06Q 20/3676 |
| 2021/0264387 A1* | 8/2021 | Frolov | G06Q 20/02 |
| 2021/0342836 A1* | 11/2021 | Cella | G06Q 50/01 |

FOREIGN PATENT DOCUMENTS

| | | |
|---|---|---|
| CN | 105488722 | 4/2016 |
| CN | 105681301 | 6/2016 |
| CN | 105809420 | 7/2016 |
| CN | 105976232 | 9/2016 |
| CN | 106056373 | 10/2016 |
| CN | 106327332 | 1/2017 |
| CN | 106504085 | 3/2017 |
| CN | 106960388 | 7/2017 |
| CN | 107016542 | 8/2017 |
| CN | 107016606 | 8/2017 |
| CN | 107038578 | 8/2017 |
| CN | 107077675 | 8/2017 |
| CN | 107133796 | 9/2017 |
| CN | 107194678 | 9/2017 |
| CN | 107248074 | 10/2017 |
| CN | 107341702 | 11/2017 |
| CN | 107358420 | 11/2017 |
| CN | 107358422 | 11/2017 |
| CN | 107358524 | 11/2017 |
| CN | 107392584 | 11/2017 |
| CN | 107392608 | 11/2017 |
| CN | 107679857 | 2/2018 |
| CN | 107729398 | 2/2018 |
| CN | 107742210 | 2/2018 |
| CN | 108009441 | 5/2018 |
| CN | 108009811 | 5/2018 |
| CN | 108038683 | 5/2018 |
| CN | 108055138 | 5/2018 |
| CN | 108074177 | 5/2018 |
| CN | 108876335 | 11/2018 |
| JP | 6218979 | 10/2017 |
| KR | 101591244 | 2/2016 |
| KR | 101649331 | 8/2016 |
| KR | 20160114749 | 10/2016 |
| KR | 20170064892 | 6/2017 |
| RU | 2016122196 | 12/2017 |
| RU | 2649788 | 4/2018 |
| RU | 2673842 | 11/2018 |
| TW | 200834456 | 8/2008 |
| TW | 201732697 | 9/2017 |
| TW | 201800997 | 1/2018 |
| TW | 201810150 | 3/2018 |
| TW | 201816679 | 5/2018 |
| WO | WO 2009012452 | 1/2009 |
| WO | WO 2016053760 | 4/2016 |
| WO | WO 2017070469 | 4/2017 |
| WO | WO 2017145047 | 8/2017 |
| WO | WO2017176093 | 10/2017 |
| WO | WO 2017178956 | 10/2017 |
| WO | WO 2018085621 | 5/2018 |
| WO | WO-2018204548 A1 * | 11/2018 ........... G06Q 20/023 |
| WO | WO-2019155331 A1 * | 8/2019 ......... G06Q 20/3829 |
| WO | WO 2019231952 | 12/2019 |
| WO | WO 2019231955 | 12/2019 |
| WO | WO 2019231961 | 12/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/US2019/034253, dated Jul. 25, 2019, 5 pages.

(56) References Cited

OTHER PUBLICATIONS

PCT International Search Report and Written Opinion in International Application No. PCT/US2019/034251, dated Aug. 2, 2019, 7 pages.
PCT International Search Report and Written Opinion in International Application No. PCT/US2019/034257, dated Aug. 15, 2019, 6 pages.
PCT International Search Report and Written Opinion in International Application No. PCT/US2019/034260, dated Aug. 15, 2019, 6 pages.
PCT International Search Report and Written Opinion in International Application No. PCT/US2019/034266, dated Aug. 16, 2019, 6 pages.
Extended European Search Report in European Application No. 19726878.2, dated Mar. 4, 2020, 7 pages.
Stellar.com [Online], "Stellar—Developers," Apr. 15, 2017, [retrieved on Jan. 14, 2020], retrieved from URL <https://web.archive.org/web/2017G415145348/https://www.stellar.org/developers/guides/get-started/index.html>, 118 pages.
Extended European Search Report in European Application No. 19727275.0, dated Mar. 20, 2020, 8 pages.
Extended European Search Report in European Application No. 19727818.7-1213, dated Apr. 16, 2020, 9 pages.
Extended European Search Report issued in European Application No. 19727819.5 dated Feb. 12, 2020, 10 pages.
MobiInside [online], "Introduction for Blockchain," dated Mar. 27, 2017, [retrieved on Dec. 24, 2019], retreived from URL<https://www.mobiinside.co.kr/2017/03/27/blockchain_1-3/>, 12 pages.
Zdnet.co.kr [online], "Bitcoin Balance Certification Service," dated Mar. 24, 2014, [retrieved on Dec. 24, 2019], retreived from URL<https://www.zdnet.co.kr/view/?no=20140324181635>, 7 pages.
Anonymous, "Blockchain Technology Financial Supervision Challenges," in Journal of Shanghai University of Political Science and Law, 2005, 12 pages (with English abstract).
"Smart contract", "Mechanism for programing a contract on a blockchain", [online], Feb. 23, 2017, [Jul. 30, 2020], Internet, <URL:https://gaiax-blockchain.com/smart-contract> (publication showing well-known technology), 6 pages.
PCT International Preliminary Reporton Patentability in international Application No. PCT/US2019/034253, dated Dec. 1, 2020, 4 pages.

\* cited by examiner

ASSET TRANSFER METHOD AND APPARATUS, AND ELECTRONIC DEVICE

CROSS-REFERENCE TO RELATED APPLICATIONS

This application claims priority to Chinese Patent Application No. 201810533816.9, filed on May 29, 2018, which is hereby incorporated by reference in its entirety.

TECHNICAL FIELD

One or more implementations of the present specification relate to the field of terminal technologies, and in particular, to an asset transfer method and apparatus, and an electronic device.

BACKGROUND

In related technologies, a solution to implement an asset transfer through a blockchain network is proposed. A user or an enterprise that pays out an asset serves as a payer, and a user or an enterprise that obtains an asset serves as a payee. An anchor in the blockchain network anchors an off-chain asset and a blockchain asset, so that the off-chain asset and the blockchain asset can be transferred properly, to implement an asset transfer between the payer and the payee.

SUMMARY

One or more implementations of the present specification provide an asset transfer method and apparatus, and an electronic device.

To achieve the previous objective, one or more implementations of the present specification provide the following technical solutions:

According to a first aspect of one or more implementations of the present specification, an asset transfer method is provided and is applied to a blockchain node, where the method includes the following: detecting an asset transfer request related to a blockchain member, where the asset transfer request involves transferring an asset to be transferred of a specified asset type to an asset held by the blockchain member, and the asset to be transferred is issued by a specified anchor in a blockchain; determining whether there is a maximum trusted asset limit that is configured by the blockchain member for the specified anchor and corresponds to the specified asset type; and prohibiting the asset transfer request from being applied to asset transfer implementation when a determining result is that the maximum trusted asset limit does not exist.

According to a second aspect of one or more implementations of the present specification, an asset transfer apparatus is provided and is applied to a blockchain node, where the apparatus includes the following: a detection unit, configured to detect an asset transfer request related to a blockchain member, where the asset transfer request involves transferring an asset to be transferred of a specified asset type to an asset held by the blockchain member, and the asset to be transferred is issued by a specified anchor in a blockchain; a limit determining unit, configured to determine whether there is a maximum trusted asset limit that is configured by the blockchain member for the specified anchor and corresponds to the specified asset type; and a restriction unit, configured to prohibit the asset transfer request from being applied to asset transfer implementation when a determining result is that the maximum trusted asset limit does not exist.

According to a third aspect of one or more implementations of the present specification, an electronic device is provided, including the following: a processor; and a memory configured to store an instruction that can be executed by the processor, where the processor is configured to implement the method according to any one of the previous implementations.

DESCRIPTION OF IMPLEMENTATIONS

Example implementations are described in detail here, and examples of the implementations are presented in the accompanying drawings. When the following description relates to the accompanying drawings, the same numbers in different accompanying drawings represent the same or similar elements unless specified otherwise. Implementations described in the following do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that, in other implementations, steps of a corresponding method are not necessarily performed in an order shown and described in the present specification. In some other implementations, the method can include more or fewer steps than those described in the present specification. In addition, a single step described in the present specification can be decomposed into multiple steps for description in other implementations. However, multiple steps described in the present specification can also be combined into a single step for description in other implementations.

Figure 1:
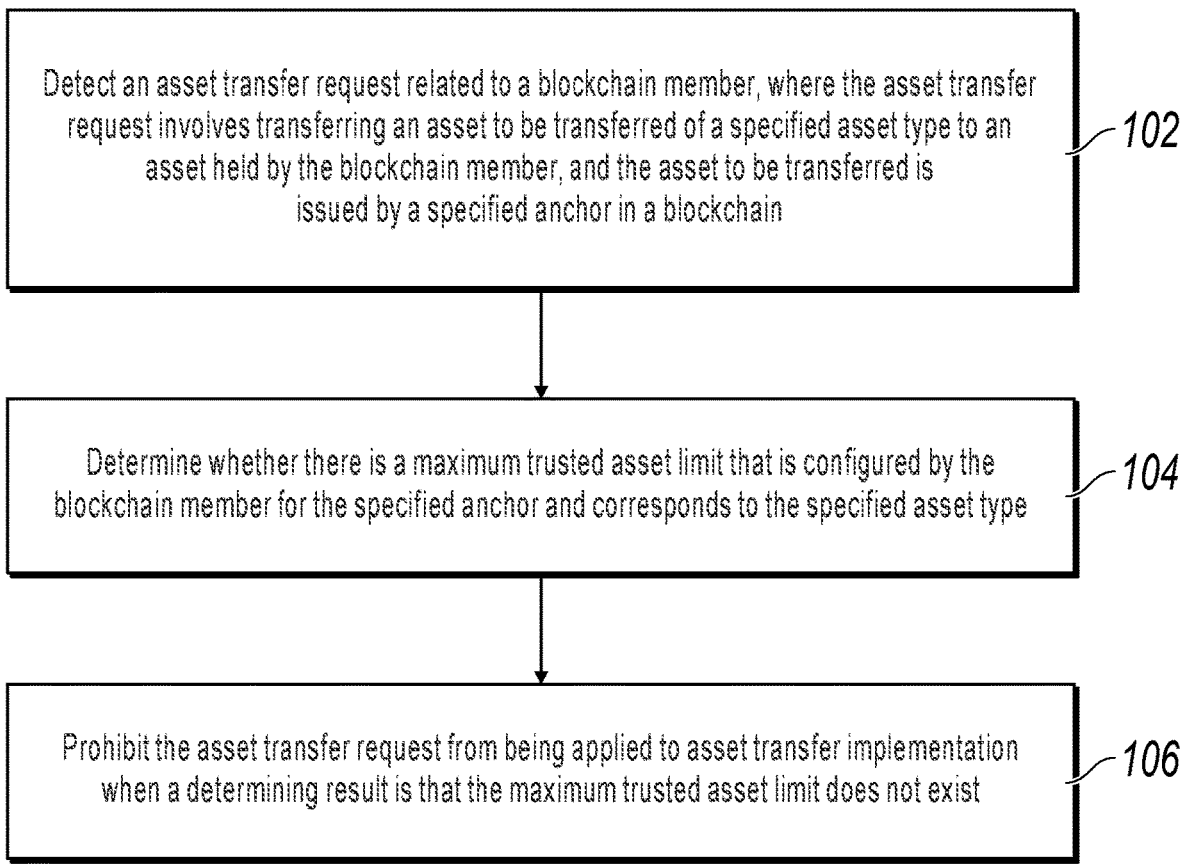
FIG. 1 is a flowchart illustrating an asset transfer method, according to an example implementation.

FIG. 1 is a flowchart illustrating an asset transfer method, according to an example implementation. As shown in FIG. 1, the method is applied to a blockchain node in a blockchain, and can include the following steps.

Step 102: Detect an asset transfer request related to a blockchain member, where the asset transfer request involves transferring an asset to be transferred of a specified asset type to an asset held by the blockchain member, and the asset to be transferred is issued by a specified anchor in the blockchain.

In an implementation, the blockchain can include several blockchain nodes, and the blockchain nodes can include the blockchain member (or briefly referred to as a member) and an anchor. Blockchain members can assume the role of the anchor. The anchor can also be independent of the blockchain member. In other words, the blockchain members do not necessarily assume the role of the anchor.

In an implementation, the blockchain member can be a financial institution that supports an asset transfer service and organizations or platforms in other forms. Implementations are not limited in the present specification.

In an implementation, the anchor is configured to anchor a blockchain asset in the blockchain and an off-chain asset outside the blockchain, so that the off-chain asset can be converted into an equivalent blockchain asset by using the anchor, or the blockchain asset can be converted into an equivalent off-chain asset by using the anchor, thereby implementing one-to-one mapping between the blockchain asset and the off-chain asset. For example, the blockchain member can deposit an off-chain asset at the anchor, and obtain and hold a blockchain asset correspondingly issued by the anchor in the blockchain. Also, the blockchain members can transfer held blockchain assets to each other, and the status of holding, by each blockchain member, a blockchain asset issued by each anchor and a change in the blockchain asset can be registered in a blockchain ledger of the blockchain, to facilitate unified management of the blockchain assets.

In an implementation, the "asset" in the present specification can be of any type, for example, cash, securities, and stocks, and for another example, devices, vehicles, real estates, and goods. The type is not limited in the present specification.

In an implementation, the blockchain member can initiate the asset transfer request. In other words, the blockchain member can initiate the asset transfer request, and transfer the asset issued by the specified anchor to the asset held by the blockchain member based on the asset transfer solution in the present specification. For example, the asset transfer request can be used to transfer the off-chain asset of the blockchain member to the blockchain, so that the specified anchor converts the off-chain asset into the previous blockchain asset of the specified asset type. For example, the asset transfer request can be used to obtain an asset that is held by another member and that is issued by the specified anchor and is of the specified asset type, and transfer the asset to the asset that is held by the blockchain member and that is issued by the specified anchor and is of the specified asset type. For example, the asset transfer request can be used to obtain an asset that is held by the blockchain member (or another member) and that is issued by the specified anchor and is of another asset type, and transfer the asset to the asset that is held by the blockchain member and that is issued by the specified anchor and is of the specified asset type. For example, the asset transfer request can be used to transfer a blockchain asset issued by another anchor and held by the blockchain member (or another member) to the asset that is held by the blockchain member and that is issued by the specified anchor and is of the specified asset type.

In an implementation, another member in the blockchain can initiate the asset transfer request. In other words, another member can initiate the asset transfer request, and transfer the blockchain asset issued by the specified anchor to the asset held by the blockchain member based on the asset transfer solution in the present specification.

Step 104: Determine whether there is a maximum trusted asset limit that is configured by the blockchain member for the specified anchor and corresponds to the specified asset type.

In an implementation, the maximum trusted asset limit is global information recorded in the blockchain ledger of the blockchain so that any blockchain node can read the maximum trusted asset limit in the form of the global information from the blockchain ledger.

In an implementation, the maximum trusted asset limit is recorded in a specified smart contract in the blockchain, and the asset transfer request is initiated in response to an operation of invoking the specified smart contract. In other words, performing the operation of invoking the specified smart contract initiates a contract operation for an asset transfer, thereby reading the maximum trusted asset limit recorded in the smart contract to determine whether the asset transfer is allowed.

In an implementation, a predefined blockchain asset issuance, depository, and freeze mechanism can determine the maximum trusted asset limit to assess a relatively reasonable and reliable maximum trusted asset limit objectively.

In an implementation, a configuration instruction transmitted by the blockchain member can be received, and the maximum trusted asset limit can be adjusted based on the configuration instruction. For example, a bridge module between the blockchain and the blockchain member can be configured. The bridge module is separately connected to a first data interface on the blockchain and a second data interface at the blockchain member, so that the blockchain member can transmit the configuration instruction to the blockchain by using the bridge module, to adjust the previously specified maximum trusted asset limit. Similarly, the blockchain member can transmit a new-creation instruction to the blockchain by using the bridge module, to create a maximum trusted asset limit for an asset type at an anchor. As such, it is ensured that a blockchain asset held by the blockchain member is not greater than the maximum trusted asset limit, where the blockchain asset is issued by the anchor and is of a certain asset type.

Step 106: Prohibit the asset transfer request from being applied to asset transfer implementation when a determining result is that the maximum trusted asset limit does not exist.

In an implementation, the maximum trusted asset limit indicates the status of the blockchain member's trust in the specified anchor: A higher maximum trusted asset limit indicates a higher degree of the blockchain member's trust in the specified anchor. In other words, the blockchain member believes that the specified anchor can convert the maximum trusted asset amount of blockchain asset into an off-chain asset.

In an implementation, when the corresponding maximum trusted asset limit does not exist, it indicates that the blockchain member does not trust the specified anchor at least with respect to the specified asset type, thereby reducing the loss risk of related assets by restricting asset transfer implementation.

In an implementation, the maximum trusted asset limit configured by the blockchain member can be obtained when the determining result is that the maximum trusted asset limit exists. A first amount of the asset to be transferred is determined, where the asset to be transferred is indicated by the asset transfer request. A second amount of an asset already held by the blockchain member is also determined, where such asset is issued by the specified anchor and is of the specified asset type. Further, when the sum of the first amount and the second amount is not greater than the maximum asset limit, it indicates that the blockchain member's trust in the specified anchor is not exceeded. Therefore, the asset transfer request can be allowed to be applied to asset transfer implementation.

In an implementation, various asset transfer scenarios can apply the asset transfer solution in the present specification, such as a domestic asset transfer, a cross-border asset transfer. Implementations are not limited in the present specification.

In an implementation, the blockchain in the present specification can be a consortium blockchain, and each member participating in an asset transfer is a consortium member of the consortium blockchain. The consortium blockchain can further include other consortium members. Implementations are not limited in the present specification.

Figure 2:
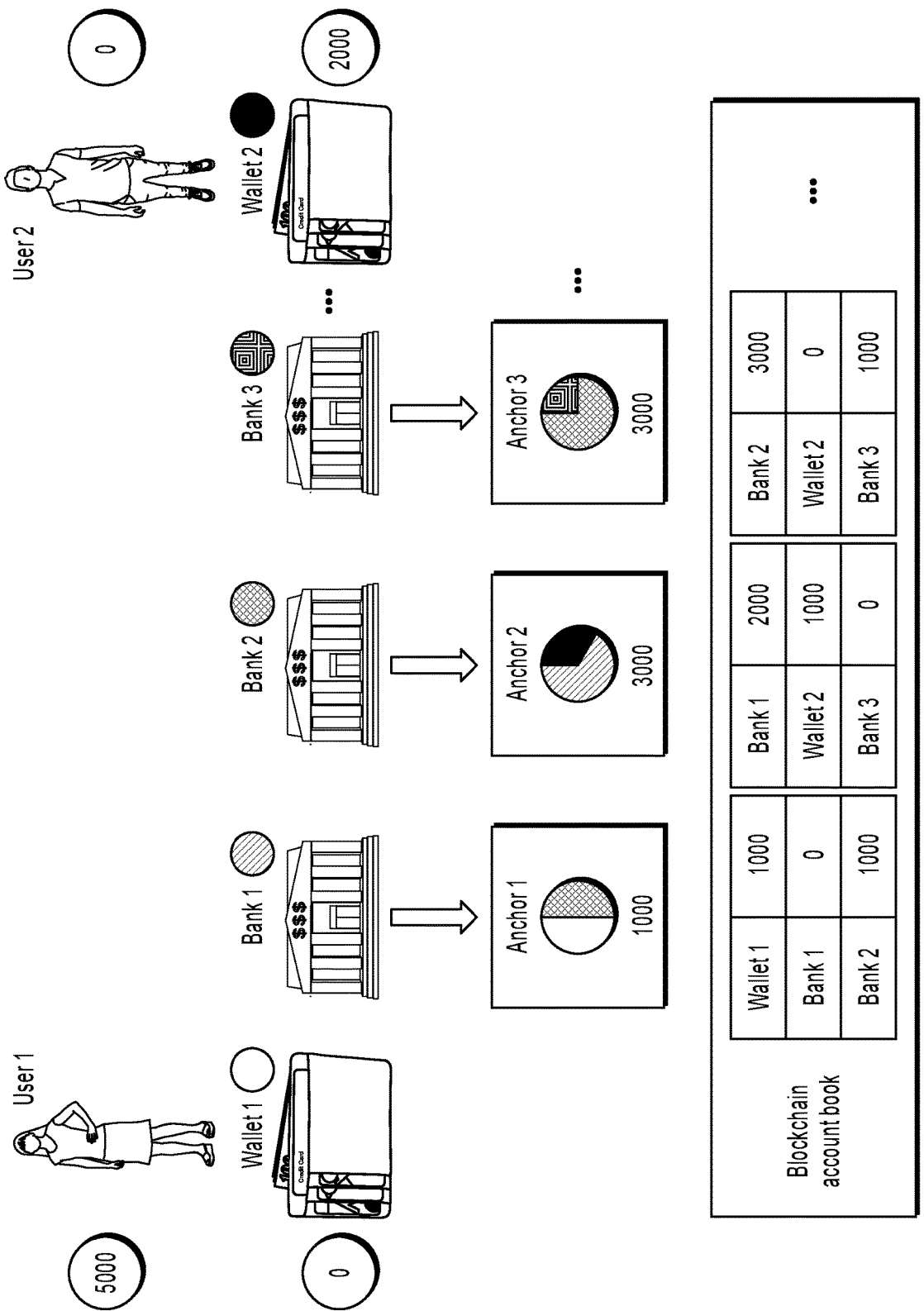
FIG. 2 is a schematic diagram illustrating a remittance scenario, according to an example implementation.

For ease of understanding, the following uses a "remittance" process as an example to describe the technical solutions of one or more implementations of the present specification. FIG. 2 is a schematic diagram illustrating a remittance scenario, according to an example implementation. As shown in FIG. 2, assume that a third-party payment platform operates wallet 1 in place A and operates wallet 2 in place B, user 1 in place A opens customer fund account 1 at wallet 1, and user 2 in place B opens customer fund account 2 at wallet 2. The fund transfer solution based on the present specification can implement a fast remittance between user 1 and user 2.

In an implementation, assume that wallet 1, wallet 2, bank 1, bank 2, bank 3 shown in FIG. 2 are some examples of members of the same blockchain, and the blockchain can include several anchors such as anchor 1, anchor 2, and anchor 3 shown in FIG. 2. A member can assume the role of the anchor. For example, anchor 1 to anchor 3 in FIG. 2 respectively correspond to bank 1 to bank 3. Certainly, the member may not assume the role of the anchor, and the anchor is not necessarily a member. In other words, there is no necessary one-to-one mapping relationship between the members and the anchors. Members such as wallets 1 and 2 and banks 1 to 3, anchors 1 to 3 are nodes in the blockchain. The nodes implement distributed accounting in the blockchain.

To implement a remittance between user 1 and user 2 by using the members in the blockchain, members such as wallets 1 and 2, banks 1 to 3 need to join a contract that corresponds to a "remittance" service in advance, referring as a remittance contract here. Each member can deposit an amount of funds at an anchor. The anchor that received funds can issue a corresponding blockchain asset in the blockchain that is held by the member that deposited the funds at that particular anchor. As such, a blockchain balance of the member is formed. For example, after wallet 1 deposits an off-chain asset of RMB 1000 at anchor 1, anchor 1 can issue a blockchain asset of RMB 1000 that is held by the wallet 1. Also, members can transfer their blockchain assets between each other. For example, although bank 1 deposits only an off-chain asset of RMB 1000 at anchor 2, bank 1 obtains a blockchain asset of RMB 1000 issued by anchor 2 from bank 2 or another member. In this way, bank 1 can hold a blockchain asset of RMB 2000 issued by anchor 2. Assume that a blockchain balance held by wallet 1 is a blockchain asset of RMB 1000 issued by anchor 1; a blockchain balance held by bank 1 is a blockchain asset of RMB 2000 issued by anchor 2; a blockchain balance held by bank 2 is a blockchain asset of RMB 1000 issued by anchor 1; a blockchain asset of RMB 1000 issued by anchor 2, and a blockchain asset of RMB 3000 issued by anchor 3; and a blockchain balance held by bank 3 is a blockchain asset of RMB 1000 issued by anchor 3. After joining the remittance contract, each member is bound by the remittance contract, so that the blockchain balance held by each member is registered in the blockchain ledger of the blockchain. In the blockchain, a number of accounting nodes (usually more than four) maintain a unified distributed ledger. The ledger records the status of the blockchain balance held by each member. The accounting node uses inter-node broadcast and consensus algorithms to enable ledger contents recorded on the nodes to be consistent, and the ledger contents are full-amount accounting information in the blockchain. Therefore, nodes in the blockchain are considered as using a unified ledger, that is, the previous blockchain ledger. Because the information in the blockchain cannot be tampered with and can be traced back, the information registered in the blockchain ledger is reliable. Therefore, members and anchors can trust the information in the blockchain, using the information as an operating basis in various fund transfer scenarios, such as a transfer and payment.

In addition, each member needs to record the status of each member's trust in each anchor in the blockchain ledger, and this status is used in a subsequent route determining process. For example, as shown in FIG. 2, although wallet 2 does not hold a blockchain asset issued by anchor 3, wallet 2 sets anchor 3 a trusted anchor. Therefore, FIG. 2 illustrates such trust status as "a blockchain balance is 0", to indicate that wallet 2 is willing to receive the blockchain asset issued by anchor 3 (for example, remitting by another member). Anchor 1 can be an anchor that wallet 2 does not trust, indicating that wallet 2 is unwilling to receive a blockchain asset issued by anchor 1.

In the present specification, the member's "trust" in the anchor can be expressed as follows: A higher degree of the member's trust in the anchor allows the member to hold a larger amount of blockchain assets issued by the anchor. For example, bank 1 setting a limit for anchor 1 as RMB 2000 indicates that it determines that anchor 1 can convert bank 1's blockchain asset into an off-chain asset if the amount of blockchain asset held by bank 1 and issued by anchor 1 does not exceed RMB 2000. Otherwise, there may be an asset loss risk. The "trust" can be referred to as a trustline. For example, the limit set by bank 1 for anchor 1 is RMB 2000 refers to as the trustline set by bank 1 for anchor 1 is RMB 2000. When the same anchor can support several types of assets, a member can separately set trustlines for each type of the assets. For example, for anchor 1, bank 1 can set trustline 1 that corresponds to HKD to RMB 2000, and set trustline 2 that corresponds to USD to RMB 1000. Different trustlines are independent of each other. When the member sets multiple trustlines for the same anchor, although the trustlines are independent of each other, the trustlines can be constrained by a total limit, to implement effective risk control by using independent limits and the total limit of the trustlines.

The implementation shown in FIG. 2 does not consider the case of multiple types of assets, and assumes that transferred assets are in the same currency. Wallet 1 sets trustline—QB1-1=RMB 1500 for anchor 1. Bank 1 sets trustline—YH1-1=RMB 3000 for anchor 1 and trustline—YH1-2=RMB 2000 for anchor 2. Bank 2 sets trustline—YH2-1=RMB 1200 for anchor 1, trustline—YH2-2=RMB 1800 for anchor 2, and trustline—YH2-3=RMB 3500 for anchor 3. Bank 3 sets trustline—YH3-2=RMB 1000 for anchor 2 and trustline—YH3-3=RMB 2000 for anchor 3. Wallet 2 sets trustline—QB2-2=RMB 3000 for anchor 2 and trustline—QB2-3=RMB 2000 for anchor 3. The trustline set by each member for each anchor is recorded in the blockchain ledger for query and for controlling an asset transfer based on the trustline when needed.

Figure 3:
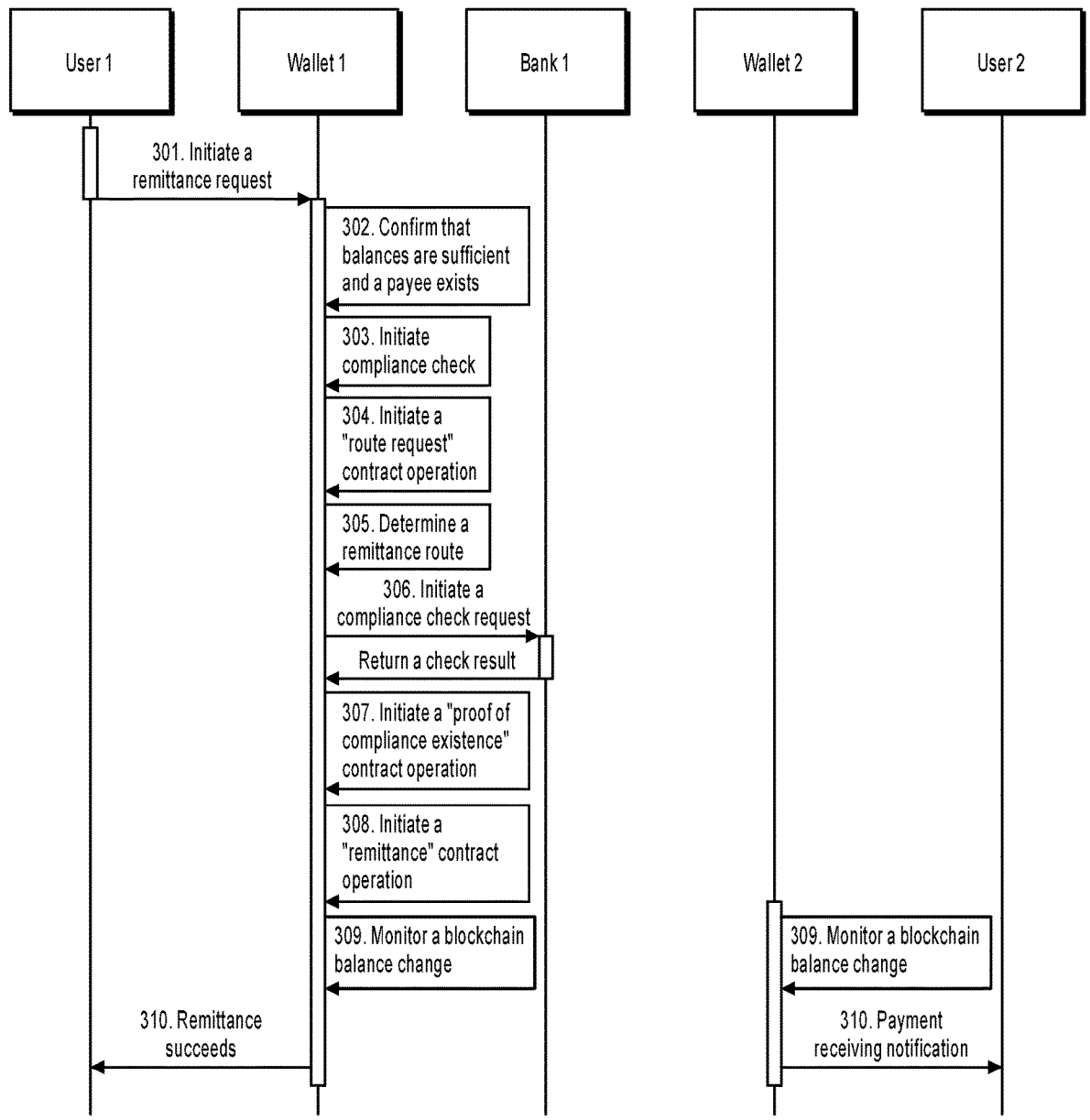
FIG. 3 is a schematic diagram illustrating interaction in a cross-border remittance process, according to an example implementation.

Based on the remittance scenario shown in FIG. 2 and the trustline set by each member, FIG. 3 is a schematic diagram illustrating interaction in a cross-border remittance process, according to an example implementation. As shown in FIG. 3, a process of interaction between users 1 and 2, wallets 1 and 2, and bank 1 can include the following steps.

Step 301: Wallet 1 receives a remittance request initiated by user 1.

In an implementation, user 1 can indicate an amount of funds that need to be remitted and a payee in the remittance request. For example, assume that user 1 sets the amount of funds to RMB 1000 and the payee to user 2. In addition to the remittance request initiated by user 1, a remittance procedure can be triggered by using other methods in other scenarios. For example, user 1 initiates a payment request indicating that an amount of funds is RMB 1000 and a payee is user 2. For another example, user 2 initiates a payment receiving request indicating that an amount of funds is RMB 1000 and a payer is user 1. Implementations are not limited in the present specification.

Step 302: Wallet 1 confirms that a balance in customer fund account 1 that corresponds to user 1 is sufficient, and confirms to wallet 2 that there exists a user 2 serving as a payee.

In an implementation, FIG. 2 illustrates that customer fund account 1 that corresponds to user 1 has a balance of RMB 5000, which is greater than a needed transfer fund of RMB 1000, and therefore the balance is confirmed as sufficient. When the balance is less than the needed transfer fund of RMB 1000, it indicates that the balance is insufficient. In this case, wallet 1 can directly terminate the remittance, and return a remittance failure notification message to user 1.

In an implementation, wallet 1 can send payee information to wallet 2, and wallet 2 determines whether the payee information is valid. The payee information can include a payee name, a payee account number, an account opening bank. Implementations are not limited in the present specification. After verifying the validity of the payee information, wallet 2 can return a corresponding verification result to wallet 1. If it is confirmed that the payee does not exist, wallet 1 can directly terminate the remittance, and return a remittance failure notification message to user 1.

Step 303: Wallet 1 can perform a compliance check on a remittance event initiated by user 1 to user 2.

In an implementation, wallet 1 can provide a material submission entry for user 1, and user 1 can provide a material to be checked for the remittance event. User 1 can submit in advance a static material (for example, an identity card photo of user 1) that can be used for all remittance events, and submit a dynamic material (for example, a recent remittance record) for a corresponding remittance event in each remittance, to improve the remittance efficiency.

In an implementation, the compliance check performed by wallet 1 on the remittance event can include at least one of: a Know Your Customer (KYC) check, and an anti-money laundering (AML) check. Implementations are not limited in the present specification.

Figure 4:
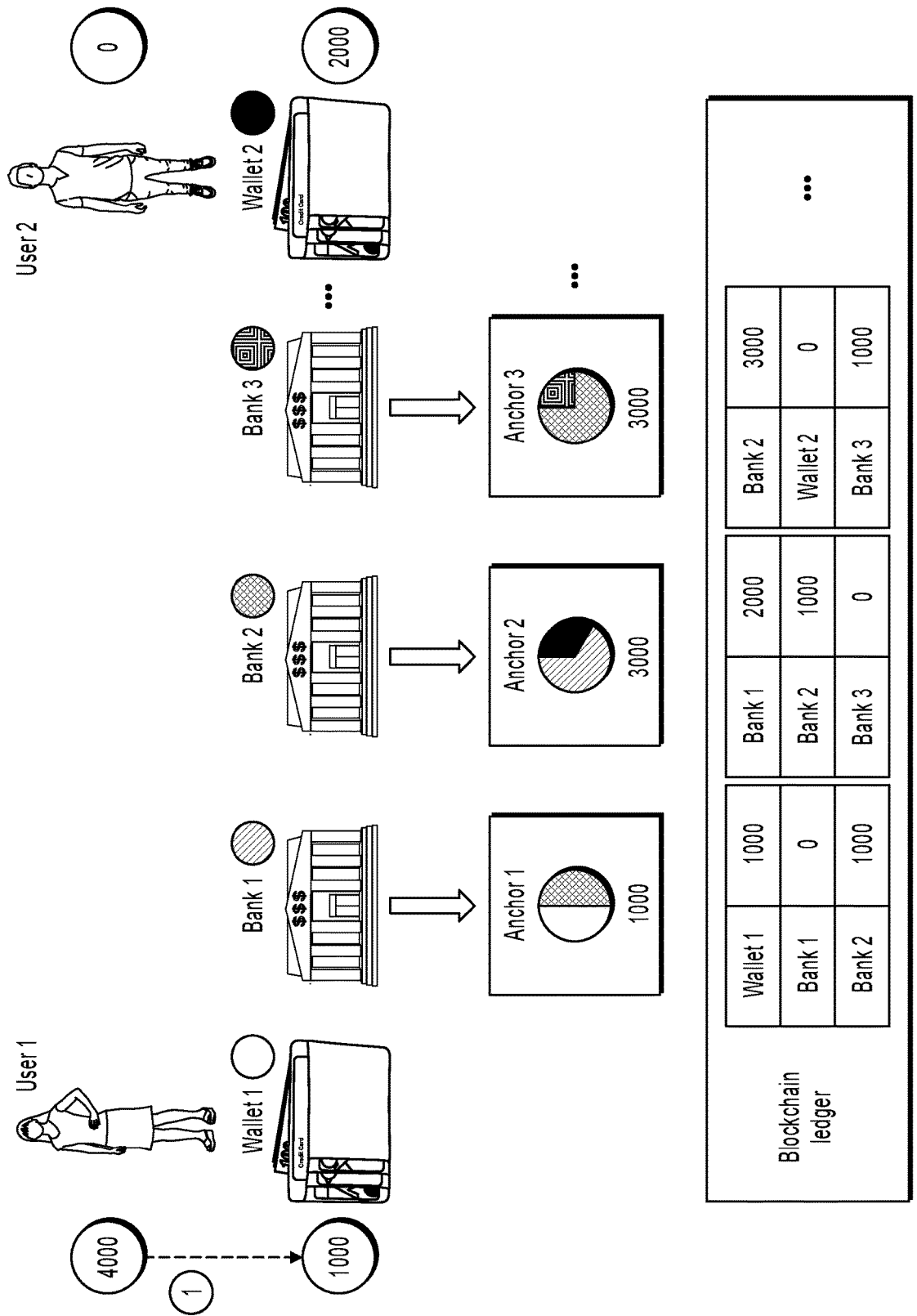
FIG. 4 is a schematic diagram illustrating a case that wallet 1 receives remittance funds provided by user 1, according to an example implementation.

In an implementation, if a check result of the compliance check that is obtained by wallet 1 is unqualified, wallet 1 can directly terminate the remittance, and return a remittance failure notification message to user 1. Alternatively, wallet 1 can provide user 1 with at least one opportunity to supplement the material. For example, wallet 1 can provide user 1 with a maximum of two opportunities. If the number of times that user 1 supplements the material is greater than two and the result is still unqualified, wallet 1 can terminate the remittance, and return a remittance failure notification message to user 1. If the check result of the compliance check that is obtained by wallet 1 is qualified, as shown in FIG. 4, wallet 1 can deduct RMB 1000 from customer fund account 1 that corresponds to user 1, and transfer RMB 1000 to self-owned account 1 of wallet 1.

Step 304: Wallet 1 initiates a "route request" contract operation.

Step 305: Wallet 1 determines a remittance route.

In an implementation, after joining a remittance contract, a member in a blockchain can invoke several contract operations supported by the remittance contract, such as the "routing request" contract operation here. The contract operation is used to determine a remittance route that user 1 makes a remittance to user 2, to implement remittance operations.

In an implementation, the remittance route includes wallet 1 as the most upstream member, wallet 2 as the most downstream member, and several relay members between the two. Based on the technical solutions of the present specification, a blockchain asset issued by an anchor in the blockchain and held by each member in the remittance route and a transfer between the blockchain assets need to be used to present the effect that "remittance funds (for example, RMB 1000 that user 1 expects to remit) are transferred from wallet 1 to wallet 2". As such, eventually, wallet 2 provides the remittance funds for user 2.

When the remittance funds are transferred between the members in the remittance route, the transfer can be divided into several fund transfers between adjacent members. For example, a remittance route "wallet 1-relay member-wallet 2" includes two pairs of adjacent members as "wallet 1-relay member" and "relay member-wallet 2". The remittance route also involves two total fund transfers, a transfer from wallet 1 to the relay member and a transfer from the relay member to wallet 2. Between each pair of adjacent members, the fund transfer needs to be implemented by using an anchor in the blockchain and involves two conditions: Condition(1): a blockchain asset issued by an anchor and held by an upstream member in the adjacent members is not less than a remittance amount; Condition(2): a downstream member in the adjacent members sets a trustline for the anchor, and the sum of the remittance amount and a blockchain asset issued by the anchor and already held by the downstream member is not greater than a limit set by the trustline. In other words, an associated anchor exists between the upstream member and the downstream member. The blockchain asset issued by the associated anchor and held by the upstream member is sufficient for the fund transfer, and the downstream member is willing to receive the blockchain asset issued by the associated anchor.

Wallet 1 can read the blockchain ledger by using full-amount accounting information stored in wallet 1. In this way, wallet 1 can learn the holding status of each member, such as the holding status of banks 1 to 3 and wallet 2 holding blockchain assets issued by each anchor such as anchors 1 to 3, respectively. Based on the learned holding status, wallet 1 can determine, with reference to the trustline set by each member, that whether each member satisfies the previous conditions (1) and (2) to further determine the remittance route.

Wallet 1 and bank 1 are used as an example. A blockchain asset issued by anchor 1 and held by wallet 1 is RMB 1000 and is not less than a remittance amount of RMB 1000. Bank 1 sets trustline—YH1-1=RMB 2000 for anchor 1, and holds a blockchain asset issued by anchor 1 as RMB 0. The sum of the blockchain asset and the remittance amount of RMB 1000 is RMB 1000< RMB 2000. Therefore, anchor 1 is an associated anchor between wallet 1 and bank 1, and wallet 1 and bank 1 can implement an asset transfer based on anchor 1.

Wallet 1 and bank 2 are used as an example. A blockchain asset issued by anchor 1 and held by wallet 1 is RMB 1000 and is not less than a remittance amount of RMB 1000. Bank 2 sets trustline—YH2-1=RMB 1200 for anchor 1 and holds a blockchain asset issued by anchor 1 as RMB 1000. The sum of the blockchain asset and the remittance amount of RMB 1000 is RMB 2000> RMB 1200. Therefore, anchor 1 is not an associated anchor between wallet 1 and bank 2, and wallet 1 and bank 2 cannot implement an asset transfer based on anchor 1.

Wallet 1 and bank 3 are used as an example. A blockchain asset issued by anchor 1 and held by wallet 1 is RMB 1000 and is not less than a remittance amount of RMB 1000. However, bank 3 does not set a trustline for anchor 1. Therefore, anchor 1 is not an associated anchor between wallet 1 and bank 3, and wallet 1 and bank 3 cannot implement an asset transfer based on anchor 1.

Bank 1 and wallet 2 are used as an example. A blockchain asset issued by anchor 2 and held by bank 1 is RMB 2000 and is not less than a remittance amount of RMB 1000. Wallet 2 sets trustline—QB2-2=RMB 3000 for anchor 2, and holds a blockchain asset issued by anchor 2 as RMB 1000. The sum of the blockchain asset and the remittance amount of RMB 1000 is RMB 2000< RMB 3000. Therefore, anchor 2 is an associated anchor between bank 1 and wallet 2, and wallet 2 and bank 1 can implement an asset transfer based on anchor 2.

Figure 5:
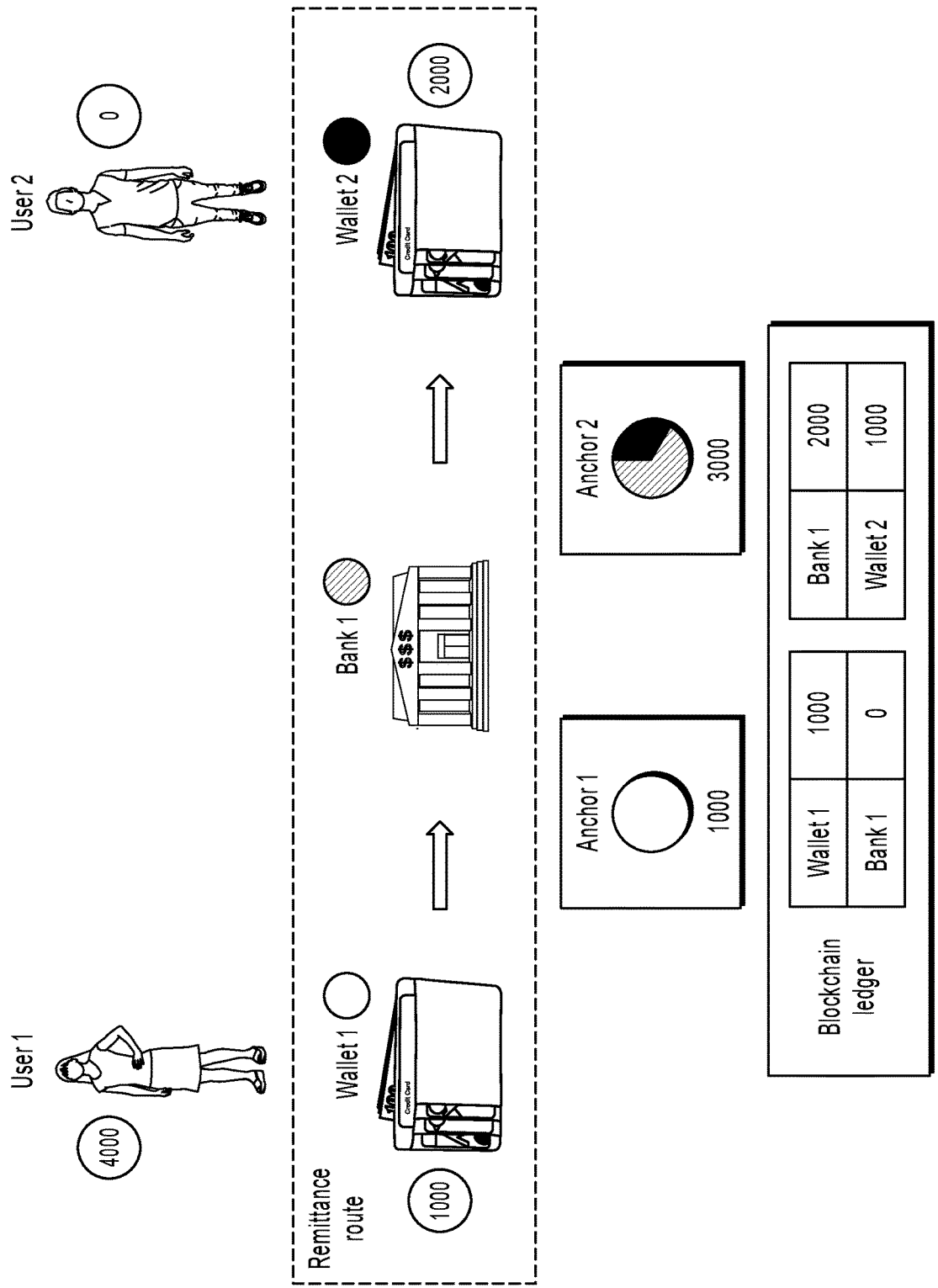
FIG. 5 is a schematic diagram illustrating a process of determining a remittance route, according to an example implementation.

Similarly, it can be determined whether each member in the blockchain satisfies condition (1) and condition (2) based on the previous methods, to determine several relay members that can sequentially connect wallet 1 and wallet 2 in series to obtain the entire remittance route. For example, FIG. 5 is a schematic diagram illustrating a process of determining a remittance route, according to an example implementation. As shown in FIG. 5, the remittance route can include wallet 1-bank 1-wallet 2. The associated anchor between wallet 1 and bank 1 is anchor 1, and the associated anchor between bank 1 and wallet 2 is anchor 2.

In an implementation, wallet 1 can simultaneously determine multiple remittance routes, and select a remittance route that is eventually used according to a certain condition. For example, the condition can include the shortest path, and the lowest cost. Implementations are not limited in the present specification.

Step 306: Wallet 1 initiates a compliance check request to all relay members in the remittance route.

In an implementation, when wallet 1 and wallet 2 belong to the same third-party payment platform, the check result of the compliance check is also applicable to wallet 2 because wallet 1 has completed the compliance check in step 303. In other words, wallet 2 does not need to perform the compliance check repeatedly. In another implementation, wallet 1 and wallet 2 may belong to different third-party payment platforms. In this case, wallet 1 can simultaneously initiate the compliance check request to all the relay members and wallet 2 in step 306, so that all the relay members and wallet 2 perform the compliance check.

In an implementation, wallet 1 can push the material to be checked provided by user 1 to bank 1, so that bank 1 performs a compliance check based on the material to be checked, for example, the previous KYC check or the AML, check. To ensure the completeness and reliability of the material to be checked in the push process, before the push, wallet 1 can generate a digital digest that corresponds to the material to be checked, and record the digital digest in the blockchain by invoking a "material proof-of-existence" contract operation. After receiving the pushed material to be checked, bank 1 can read the digital digest from the blockchain, and compare the digital digest with the digital digest of the received material to be checked. If the digital digests are the same, it is confirmed that the material to be checked is complete and reliable. Otherwise, it indicates that the material to be checked is faulty, and wallet 1 needs to re-provide a material to be checked.

In an implementation, after completing the compliance check request, a member in the remittance route can return a corresponding check result to wallet 1. The check result can include a digital digest that corresponds to detailed data of the compliance check performed by that particular member, a determining result (qualified or unqualified), and signature information of that particular member (indicating that the check result is from any member). The detailed data that corresponds to the digital digest included in the check result is related to privacy information of user 1, user 2. Also, a non-disclosure rule applies when that particular member performs the compliance check. Therefore, the check result only includes the digital digest, and the detailed data is recorded at that particular member, subsequently providing to a regulatory department for verification or check.

Step 307: Wallet 1 initiates a "compliance proof-of-existence" contract operation to record an obtained check result in a blockchain ledger.

In an implementation, wallet 1 can initiate a "compliance proof-of-existence" contract operation to record the check result returned by bank 1 in a block that corresponds to wallet 1, and further broadcast the check result to other nodes in the blockchain for recording. In other words, wallet 1 records the check result in the blockchain ledger. Because the blockchain cannot be tampered with and can be traced back, the check result can be reliable enough for subsequent retrieval and viewing by the regulatory department.

Similarly, wallet 1 can also initiate a "compliance proof-of-existence" contract operation to record the check result obtained in step 303 in the blockchain ledger for subsequent retrieval and viewing.

In an implementation, wallet 1 can provide user 1 with at least one opportunity of supplementing the material when the check result returned by a member is unqualified. After obtaining a supplementary material, wallet 1 can provide the supplementary material for that member, enabling that member to re-perform a compliance check. Wallet 1 can record a digital digest of the supplementary material in the blockchain ledger, enabling that member to compare the digital digest of the received supplementary material with the digital digest recorded in the blockchain ledger, to determine whether the received supplementary material is reliable. Assume that wallet 1 can provide user 1 with a maximum of two opportunities. If the number of times that user 1 supplements the material is greater than two and the check result returned by that member is still unqualified, wallet 1 can terminate the remittance, and return a remittance failure notification message to user 1.

In an implementation, after wallet 1 initiates the compliance check request to bank 1, if the returned check result is not received within a predetermined duration (for example, two minutes), wallet 1 can determine that the check result is unqualified. Therefore, on the one hand, wallet 1 records the "unqualified" check result in the blockchain ledger by invoking the "compliance proof-of-existence" contract operation; on the other hand, wallet 1 terminates the remittance, and returns a remittance failure notification message to user 1.

Step 308: Wallet 1 initiates a "remittance" contract operation when compliance check results of bank 1 are all qualified, to implement a fund transfer between members in the remittance route.

Figure 6:
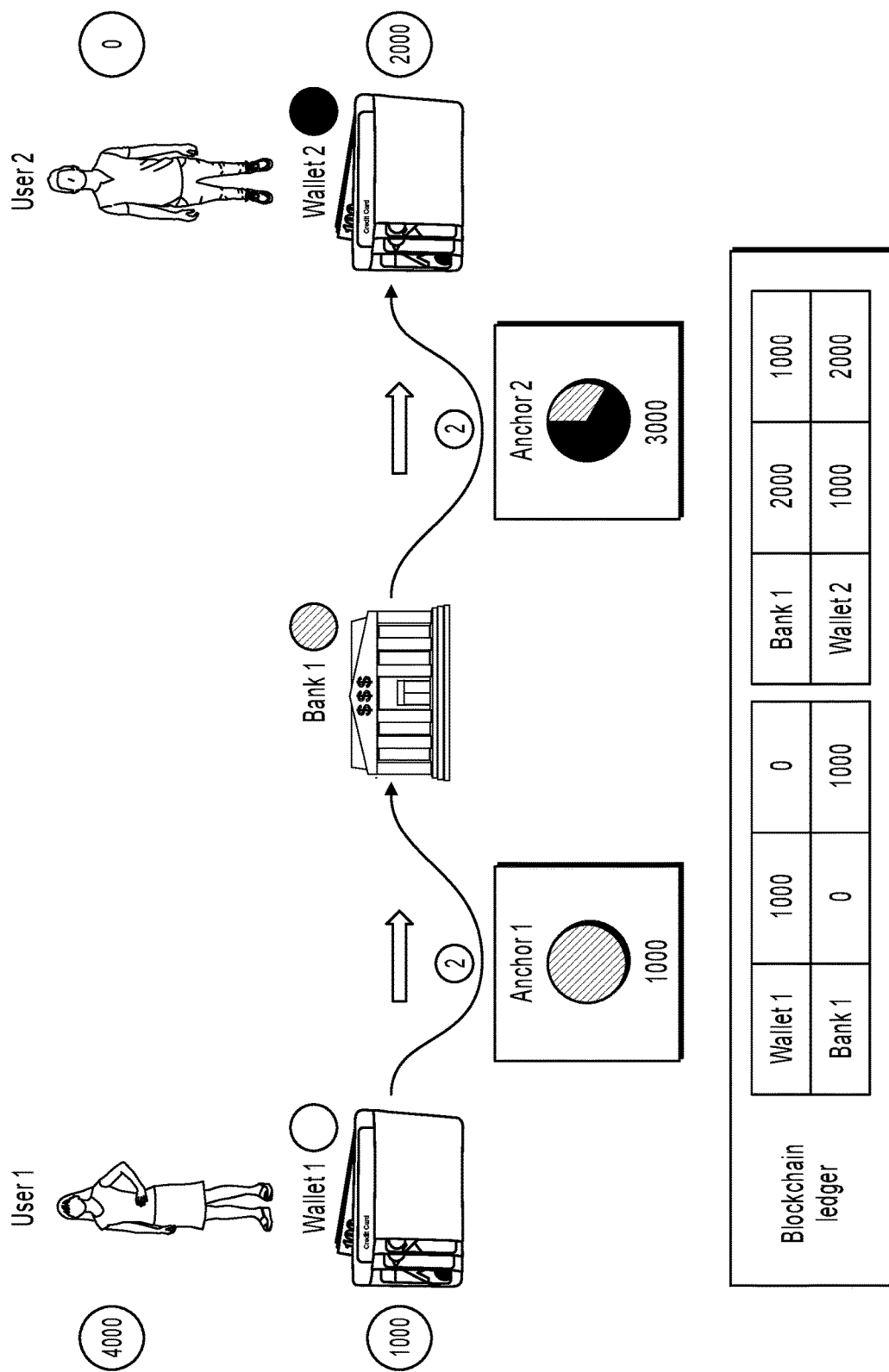
FIG. 6 is a schematic diagram illustrating a fund transfer implemented between members in a remittance route, according to an example implementation.

In an implementation, before the "remittance" contract operation takes effect, the blockchain ledger records the blockchain balance shown in FIG. 5. The blockchain balance includes, for example, RMB 1000—blockchain asset issued by anchor 1 and held by wallet 1, RMB 0—the blockchain asset issued by anchor 1 and held by bank 1, RMB 2000—the blockchain asset issued by anchor 2 and held by bank 1, and RMB 1000—the blockchain asset issued by anchor 2 and held by wallet 2. After the "remittance" contract operation takes effect, fund transfers sequentially occur between wallet 1, bank 1, and wallet 2 in the remittance route, as shown in FIG. 6.

A fund transfer between wallet 1 and bank 1 is implemented by using anchor 1. The blockchain asset issued by anchor 1 and held by wallet 1 is transferred to bank 1 by RMB 1000, so that the blockchain asset issued by anchor 1 and held by wallet 1 decreases from RMB 1000 to RMB 0, and the blockchain asset issued by anchor 1 and held by bank 1 increases from RMB 0 to RMB 1000. As described above, because bank 1 sets trustline—YH1-1=2000>+1000 for anchor 1, the previous fund transfer can be implemented at anchor 1.

A fund transfer between bank 1 and wallet 2 is implemented by using anchor 2. The blockchain asset issued by anchor 2 and held by bank 1 is transferred to wallet 2 by RMB 1000, so that the blockchain asset issued by anchor 2 and held by bank 1 decreases from RMB 2000 to RMB 1000, and the blockchain asset issued by anchor 2 and held by wallet 2 increases from RMB 1000 to RMB 2000. As described above, because wallet 2 sets a trustline—QB2-2=3000>1000+1000 for anchor 2, the previous fund transfer can be implemented at anchor 2.

In the previous processes of the fund transfer between wallet 1 and bank 1 and the fund transfer between bank 1 and wallet 2, RMB 1000 transferred from customer fund account 1 of user 1 is added to self-owned account 1 of wallet 1, and the blockchain asset issued by anchor 1 and held by wallet 1 decreases by RMB 1000. In other words, a net fund transfer amount of wallet 1 is RMB 0. The blockchain asset issued by anchor 1 and held by bank 1 increases by RMB 1000, and the blockchain asset issued by anchor 2 and held by bank 1 decreases by RMB 1000. In other words, a net fund transfer amount of bank 1 is RMB 0. The blockchain asset issued by anchor 2 and held by wallet 2 increases by RMB 1000. In other words, RMB 1000 remitted by user 1 is transferred to the blockchain balance of wallet 2 through the remittance route.

It is worthwhile to note that, because the nodes in the blockchain use the unified blockchain ledger, that is, the blockchain ledger records the status of holding, by each member, a blockchain asset issued by each anchor, the blockchain can simultaneously adjust, in a unified way, the blockchain asset issued by anchor 1 and held by wallet 1, the blockchain assets separately issued by anchor 1 and anchor 2 and held by bank 1, and the blockchain asset issued by anchor 2 and held by wallet 2. As such, at the same time, the blockchain balance of wallet 1 decreases by the blockchain asset of RMB 1000 issued by anchor 1, the blockchain balance of wallet 2 increases by the blockchain asset of RMB 1000 issued by anchor 2, and a blockchain balance of the relay member is equivalent to be unchanged.

Figure 7:
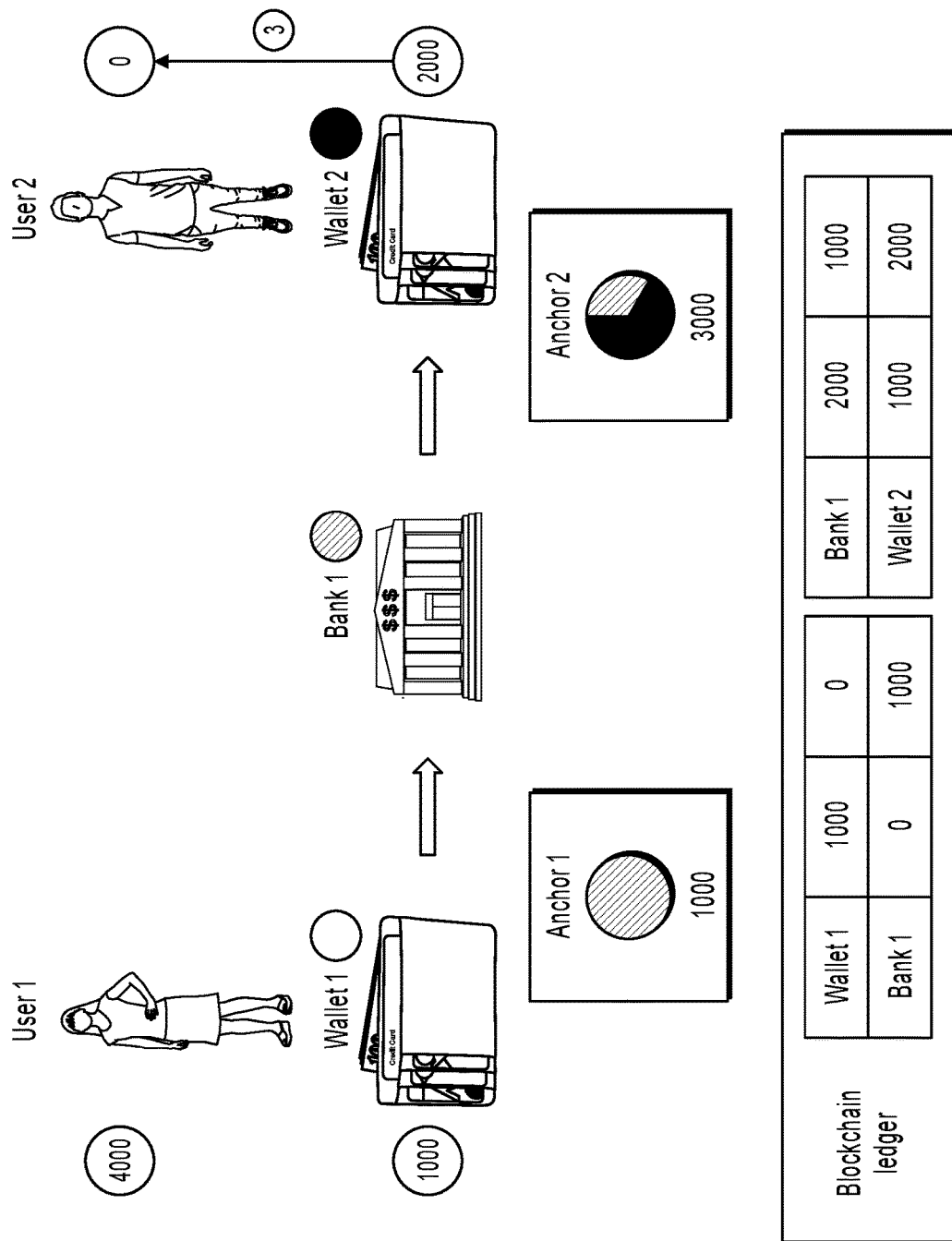
FIG. 7 is a schematic diagram illustrating a case that wallet 2 provides remittance funds for user 2, according to an example implementation.

In this case, as shown in FIG. 7, wallet 2 can transfer RMB 1000 from self-owned account 2 to customer fund account 2 opened by user 2 at wallet 2, and combine RMB 1000 increased in the blockchain asset issued by anchor 2 and held by wallet 2. As such, eventually, a net fund transfer amount of wallet 2 is RMB 0, and user 2 obtains the remittance of RMB 1000 from user 1.

Step 309: Wallet 1 and wallet 2 separately monitor a blockchain balance change.

Step 310: Wallet 1 sends a remittance success notification to user 1, and wallet 2 sends a payment receiving notification to user 2.

Figure 8:
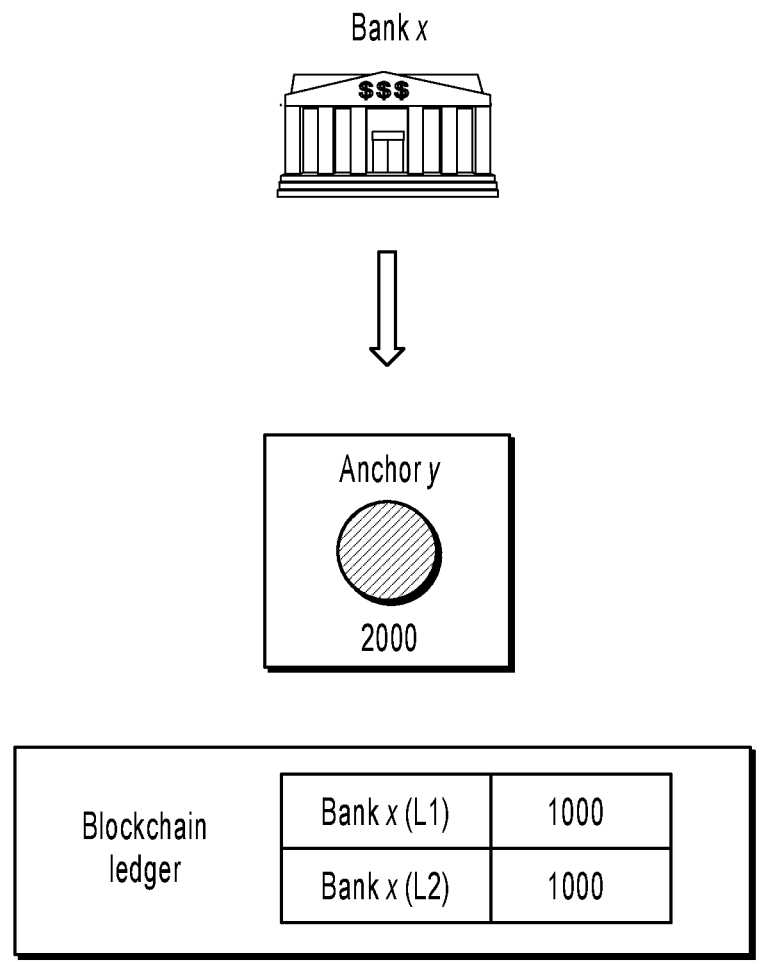
FIG. 8 is a schematic diagram illustrating an asset transfer involving multiple types of assets, according to an example implementation.

FIG. 8 is a schematic diagram illustrating an asset transfer involving multiple types of assets, according to an example implementation. As shown in FIG. 8, assume that bank y supports multiple types of assets, such as L1 and L2. Correspondingly, when bank x trusts anchor y, bank x can separately set corresponding trustlines for various types of assets issued by anchor y, to indicate a degree of the trust in anchor y when facing various types of assets. For example, bank x can set a corresponding trustline—YHx-y-L1=RMB 2000 for an asset of type L1 issued by anchor y and a corresponding trustline—YHx-y-L2=RMB 2000 for an asset of type L2 issued by anchor y. There is a 1:2 conversion ratio between the asset of type L1 and the asset of type L2. In other words, RMB 1 of type L1 is equivalent to RMB 2 of type L2.

Therefore, when bank x initiates a contract operation, expecting to transfer an asset of type L1 of RMB 1000 issued by anchor y and held by bank x to an asset of type L2, the asset of type L2 issued by anchor y and held by bank x is RMB 1000, and bank x sets trustline—YHx-y-L2=RMB 2000 for type L2 at anchor y. However, the asset of type L1 of RMB 1000 is equivalent to an asset of type L2 of RMB 2000. As a result, 2000+1000=3000>2000, and consequently the previous asset transfer cannot be implemented.

Similarly, when bank x initiates a contract operation, expecting to transfer an asset of type L2 of RMB 1000 issued by anchor y and held by bank x to an asset of type L1, the asset of type L1 issued by anchor y and held by bank x is RMB 1000, and bank x sets trustline—YHx-y-L1=RMB 2000 for type L1 at anchor y. However, the asset of type L2 of RMB 1000 is equivalent to an asset of type L1 of RMB 500, so that 1000+500=1500<2000. Therefore, the previous asset transfer can be successfully implemented, and the blockchain asset issued by anchor y and held by bank x after the transfer includes the asset of type L1 of RMB 1500 and the asset of type L2 of RMB 0.

In the implementations shown in FIG. 2 to FIG. 7, when a single type of asset issued by multiple anchors is transferred, a corresponding asset transfer can be implemented, and the blockchain member participating in the asset transfer process provides an asset transfer function by using a specified trustline.

In the implementation shown in FIG. 8, when multiple types of assets issued by a certain anchor are transferred, conversion between the assets is implemented, and the blockchain member participating in the asset transfer process provides an asset conversion function by using a specified trustline.

In some scenarios, the blockchain member can provide both the asset transfer function and the conversion function by using specified trustlines. In the implementations shown in FIG. 2 to FIG. 7, assume that wallet 1 and bank 1 transfer held assets that are issued by anchor 1, where the asset types are type 1; bank 1 and wallet 2 transfer held assets that are issued by anchor 2, where the asset types are type 2. In this case, in addition to the transfer function, the conversion function is implemented in the previous asset transfer process, and conversion needs to be performed based on an exchange rate between type 1 and type 2.

Figure 9:
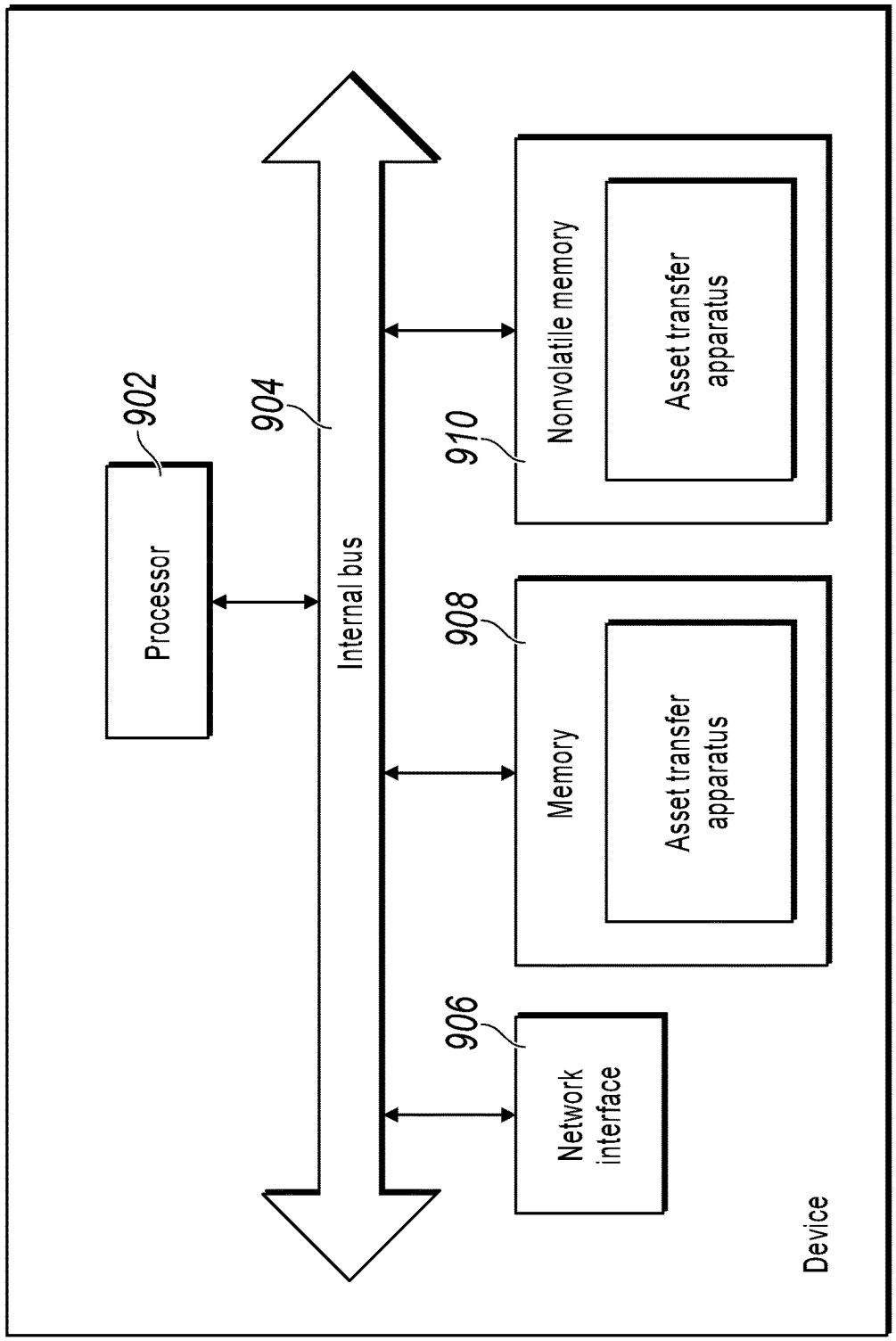
FIG. 9 is a schematic structural diagram illustrating a device, according to an example implementation.

FIG. 9 is a schematic structural diagram illustrating a device, according to an example implementation. Referring to FIG. 9, in terms of hardware, the device includes a processor 902, an internal bus 904, a network interface 906, a memory 908, and a nonvolatile memory 910, and certainly can further include the hardware needed by other services. The processor 902 reads a corresponding computer program from the nonvolatile memory 910 to the memory 908 for running, logically forming an asset transfer apparatus. Certainly, in addition to a software implementation, one or more implementations of the present specification do not exclude another implementation, for example, a logic device or a combination of hardware and software. That is, an executive body of the following processing procedure is not limited to each logical unit, and can also be hardware or a logic device.

Figure 10:
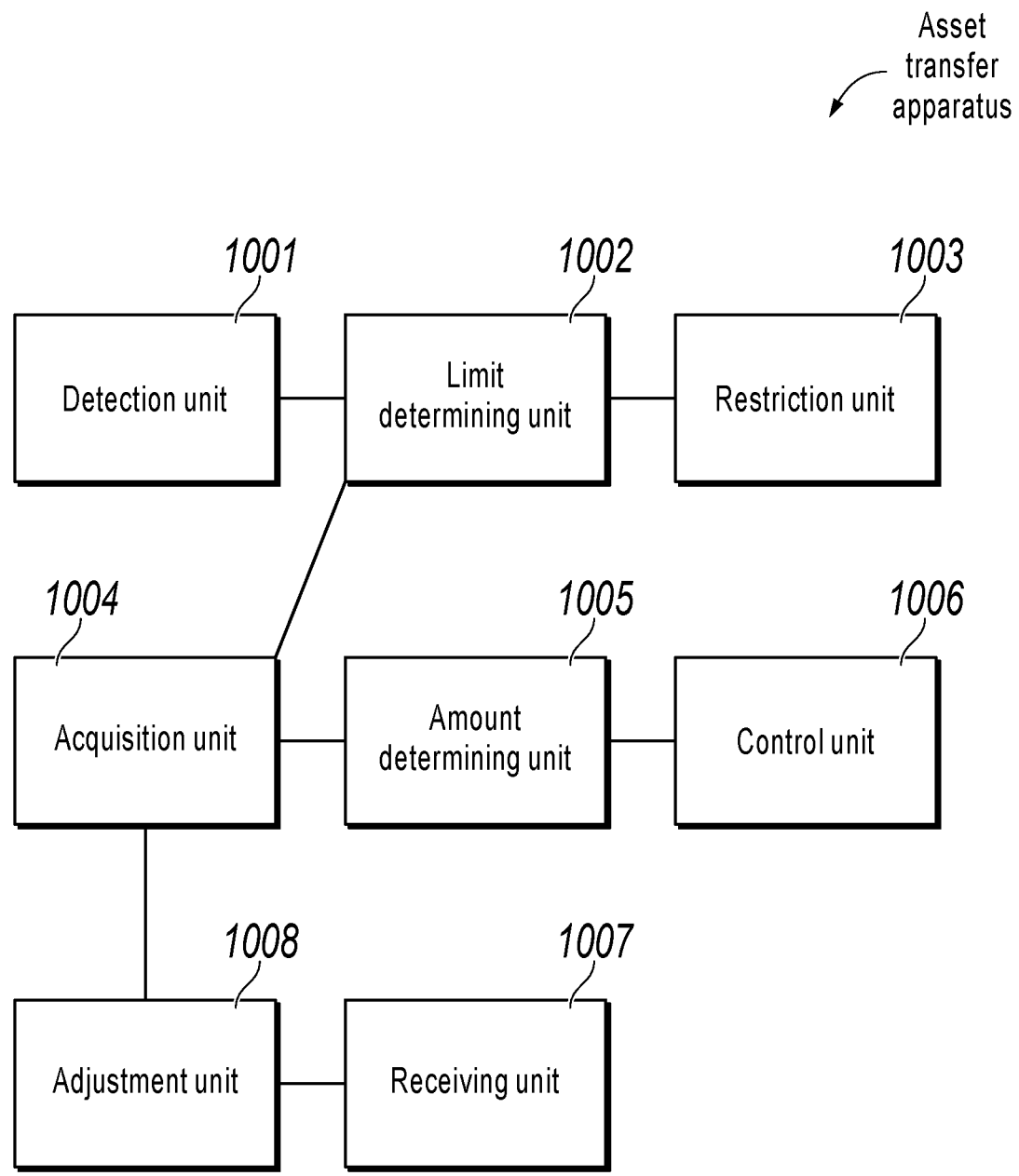
FIG. 10 is a block diagram illustrating an asset transfer apparatus, according to an example implementation.

Referring to FIG. 10, in a software implementation, the asset transfer apparatus can include the following: a detection unit 1001, configured to detect an asset transfer request related to a blockchain member, where the asset transfer request involves transferring an asset to be transferred of a specified asset type to an asset held by the blockchain member, and the asset to be transferred is issued by a specified anchor in a blockchain; a limit determining unit 1002, configured to determine whether there is a maximum trusted asset limit that is configured by the blockchain member for the specified anchor and corresponds to the specified asset type; and a restriction unit 1003, configured to prohibit the asset transfer request from being applied to asset transfer implementation when a determining result is that the maximum trusted asset limit does not exist.

Optionally, the apparatus further includes the following: an acquisition unit 1004, configured to obtain the maximum trusted asset limit configured by the blockchain member when the determining result is that the maximum trusted asset limit exists; an amount determining unit 1005, configured to determine a first amount of the asset to be transferred that is indicated by the asset transfer request and a second amount of an asset that is already held by the blockchain member and that is issued by the specified anchor and is of the specified asset type; and a control unit 1006, configured to allow the asset transfer request to be applied to asset transfer implementation when the sum of the first amount and the second amount is not greater than the maximum asset limit.

Optionally, the maximum trusted asset limit is global information recorded in a blockchain ledger of the blockchain.

Optionally, the maximum trusted asset limit is recorded in a specified smart contract in the blockchain, and the asset transfer request is initiated in response to an operation of invoking the specified smart contract.

Optionally, the asset transfer request is initiated by the blockchain member, or the asset transfer request is initiated by another member in the blockchain.

Optionally, the apparatus further includes the following: a receiving unit 1007, configured to receive a configuration instruction transmitted by the blockchain member; and an adjustment unit 1008, configured to adjust the maximum trusted asset limit based on the configuration instruction.

Optionally, the maximum trusted asset limit is determined by a predefined blockchain asset issuance, depository, and freeze mechanism.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a quantum memory, a graphene-based storage medium, another magnetic storage device, or any other non-transmission medium. The computer storage medium can be used to store information that can be accessed by the computing device Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Particular implementations of the present application are described above. Other implementations fall within the scope of the appended claims. In some cases, the actions or steps described in the claims can be performed in an order different from the order in the implementation and the desired results can still be achieved. In addition, the process depicted in the accompanying drawings does not necessarily need a particular execution order to achieve the desired results. In some implementations, multi-tasking and parallel processing can be advantageous.

The terms used in one or more implementations of the present specification are merely for the purpose of describing particular implementations, and are not intended to limit one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", and "third" can be used in one or more implementations of the present specification to describe various types of information, the information is not limited to the terms. These terms are only used to differentiate information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only examples of one or more implementations of the present specification, but are not intended to limit one or more implementations of the present specification. Any modification, equivalent replacement, or improvement made without departing from the spirit and principle of the one or more implementations of the present specification shall fall within the protection scope of the one or more implementations of the present specification.

Figure 11:
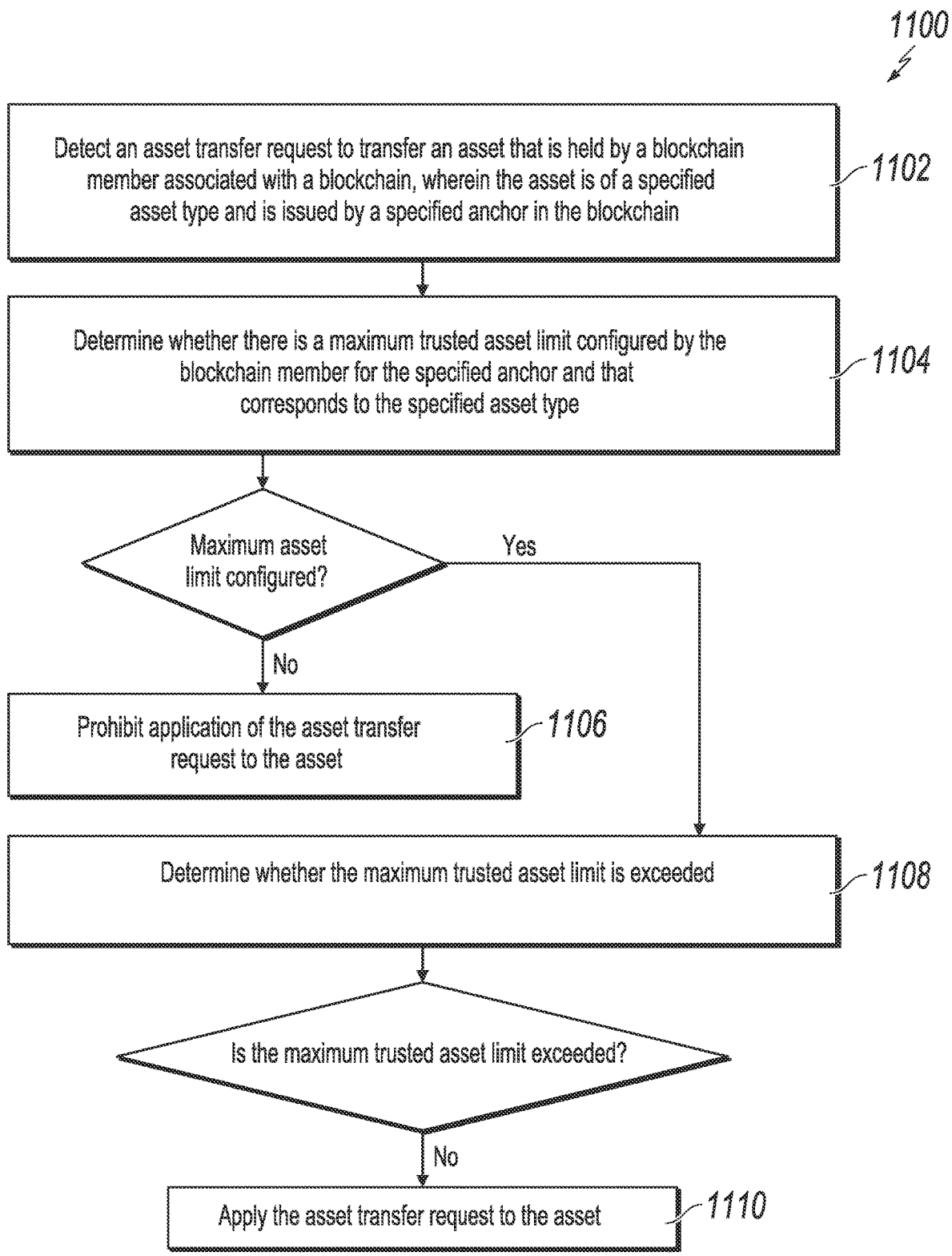
FIG. 11 is a flowchart illustrating an example of a computer-implemented method for transferring data assets in a blockchain, according to an implementation of the present disclosure.

FIG. 11 is a flowchart illustrating an example of a computer-implemented method 1100 for transferring data assets in a blockchain, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, an asset transfer request to transfer an asset to a blockchain member associated with a blockchain is detected, where the asset is of a specified asset type and is issued by a specified anchor in the blockchain. In some implementations, the blockchain includes a number of blockchain nodes, where the number of blockchain nodes include a plurality of blockchain members and a plurality of anchors, and where each anchor is configured to anchor a blockchain asset in the blockchain and an off-chain asset outside of the blockchain. After 1102, method 1100 proceeds to 1104.

At 1104, a determination is made as to whether there is a maximum trusted asset limit configured by the blockchain member for the specified anchor and that corresponds to the specified asset type. In some implementations, the maximum trusted asset limit is adjusted based on a configuration instruction sent by the blockchain member. In some implementations, the maximum trusted asset limit is global information recorded in a blockchain ledger of the blockchain. In some implementations, the maximum trusted asset limit is recorded in a specified smart contract in the blockchain, and the asset transfer request is initiated in response to an operation to invoke the specified smart contract. In some implementations, the maximum trusted asset limit is determined by a predefined blockchain asset issuance, depository, and freeze mechanism.

If it is determined that the maximum trusted asset limit is not configured method 1100 proceeds to 1106. At 1106, application of the asset transfer request to the asset is prohibited.

Returning to 1104, if it is determined that the maximum trusted asset limit is configured, method 1100 proceeds to 1108. At 1108, a determination is made as to whether the maximum trusted asset limit is exceeded. In some implementations, determining whether the maximum trusted asset limit is exceeded includes determining a first amount of the asset to the blockchain member, where the asset is indicated by the asset transfer request; determining a second amount of an asset that is held by the blockchain member; and comparing a sum of the first amount of the asset and the second amount of the asset with the maximum trusted asset limit.

If it is determined that the trust of the blockchain member in the specified anchor is not exceeded, method 1100 proceeds to 1110. At 1110, the asset transfer request is applied to the asset. After 1110, method 1100 can stop.

Implementations of the present application can solve technical problems in data transfer. Traditionally, data is transferred between users without considering data type and a maximum amount of data a user is able to accept, resulting in several possible problems. For example, because each user can have a different degree of trust of other users for different types of incoming data, additional authorization steps may need to be performed to confirm whether the source of incoming data can be considered to be trusted. What is needed is a technique to bypass these problems in traditional methods and to providing a more efficient and secure solution for data transfer between different users.

According to described implementations, each user can join a blockchain as a blockchain member in advance and be bound by a smart contract. For each member, a maximum amount of data for a certain data type that can be accepted from another member is preset as a "trustline". The "trustline" is recorded in a specified smart contract in the blockchain, and a data transfer request is initiated in response to an operation invoking specific contract. That is, invoking the specified smart contract initiates a contract operation for a data transfer, thereby reading the trustline recorded in the smart contract to determine whether the data transfer can be allowed.

In some implementations, described methods and apparatus can reduce data processing for each blockchain node device by presetting the maximum amount and type of data a user is willing to accept from a specific blockchain node device and recording the data in an automatically executed smart contract. The described configuration of the blockchain node device can save computer processing cycles, computer memory usage, and network bandwidth when compared to processing the described data with traditional methods. For example, the use of the described trustline can altogether stop excessive amounts of data transfer across a network, prevent unnecessary data processing by a processor, or limit the amount of data that needs to be stored on a data storage device. Additionally, the trustline can be used to enhance data security in both access and transfer of data in a blockchain network.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   establishing, by a given anchor in a blockchain network comprising (i) a blockchain, (ii) a plurality of blockchain members, and (iii) a plurality of anchors, a connection with other nodes in the blockchain network, wherein each anchor is a respective node on the blockchain network, and wherein the given anchor issues blockchain assets to at least a portion of the plurality of blockchain members and exchanges the blockchain assets issued by the given anchor for corresponding off-chain assets;
   issuing, by the given anchor, one or more blockchain assets of a specified blockchain asset type to a blockchain wallet of a first user;
   receiving, by a first blockchain node of a first financial institution member of the blockchain network, an asset transfer request that requests transfer, from the blockchain wallet of a first user to a given blockchain member in the blockchain network, of a given blockchain asset of the specified blockchain asset type that was issued to the blockchain wallet by the given anchor in the blockchain;
   determining, by the first blockchain node, that there is insufficient trust specified by the given blockchain member for receiving the given blockchain asset issued by the given anchor, the determining comprising:
     invoking a specified smart contract stored in the blockchain;
     in response to invoking the specified smart contract, obtaining, from the specified smart contract, recorded data comprising different maximum trusted asset limits configured by the given blockchain member for different anchors in the blockchain network, and
     determining, based on a maximum trusted asset limit for the given anchor and that corresponds to the specified blockchain asset type being absent from the recorded data of the specified smart contract, that the given blockchain member has not configured and published, to the blockchain, the maximum trusted asset limit for the given anchor and that corresponds to the specified blockchain asset type; and
   in response to determining, by the first blockchain node that there is insufficient trust specified by the given blockchain member for receiving the given blockchain asset issued by the given anchor, prohibiting application of the asset transfer request to the given blockchain asset by the first blockchain node.

2. The computer-implemented method of claim 1, wherein each anchor is configured to anchor a blockchain asset in the blockchain and an off-chain asset outside of the blockchain.

3. The computer-implemented method of claim 1, further comprising:
   receiving a configuration instruction sent by the first blockchain member, wherein the configuration instruction specifies an adjustment to an additional maximum trusted asset limit for an additional blockchain asset type; and
   adjusting the additional maximum trusted asset limit based on the configuration instruction.

4. The computer-implemented method of claim 3, wherein the additional maximum trusted asset limit is global information recorded in a blockchain ledger of the blockchain.

5. The computer-implemented method of claim 3, wherein the additional maximum trusted asset limit is recorded in the specified smart contract in the blockchain, and wherein the asset transfer request is initiated in response to an operation to invoke the specified smart contract.

6. The computer-implemented method of claim 3, wherein the additional maximum trusted asset limit is determined by a predefined blockchain asset issuance, depository, and freeze mechanism.

7. A computer-implemented system, comprising:
   one or more first processors of a given anchor in a blockchain network;
   one or more second processors of a first blockchain node in the blockchain network; and
   one or more first computer memory devices interoperably coupled with the one or more first processors and having tangible, non-transitory, machine-readable media storing one or more first instructions that, when executed by the one or more first processors, cause the one or more first processors to perform one or more operations comprising:
     establishing, by a given anchor in a blockchain network comprising (i) a blockchain, (ii) a plurality of blockchain members, and (iii) a plurality of anchors, a connection with other nodes in the blockchain network, wherein each anchor is a respective node on the blockchain network, and wherein the given anchor issues blockchain assets to at least a portion of the plurality of blockchain members and exchanges the blockchain assets issued by the given anchor for corresponding off-chain assets;
     issuing, by the given anchor in a blockchain network, one or more blockchain assets of a specified blockchain asset type to a blockchain wallet of a first user;
   one or more second computer memory devices interoperably coupled with the one or more second processors and having tangible, non-transitory, machine-readable media storing one or more second instructions that, when executed by the one or more second processors, cause the one or more second processors to perform one or more operations comprising:

receiving, by the first blockchain node of a first financial institution member of the blockchain network, an asset transfer request that requests transfer, from the blockchain wallet of a first user to a given blockchain member in the blockchain network, of a given blockchain asset of the specified blockchain asset type that was issued to the blockchain wallet by the given anchor in the blockchain;

determining, by the first blockchain node, that there is insufficient trust specified by the given blockchain member for receiving the given blockchain asset issued by the given anchor, the determining comprising:

invoking a specified smart contract stored in the blockchain;

in response to invoking the specified smart contract, obtaining, from the specified smart contract, recorded data comprising different maximum trusted asset limits configured by the given blockchain member for different anchors in the blockchain network, and determining, based on a maximum trusted asset limit for the given anchor and that corresponds to the specified blockchain asset type being absent from the recorded data, that the given blockchain member has not configured and published, to the blockchain, the maximum trusted asset limit for the given anchor and that corresponds to the specified blockchain asset type; and in response to determining, by the first blockchain node that there is insufficient trust specified by the given blockchain member for receiving the given blockchain asset issued by the given anchor, prohibiting application of the asset transfer request to the given blockchain asset by the first blockchain node.

8. The computer-implemented system of claim 7, wherein each anchor is configured to anchor a blockchain asset in the blockchain and an off-chain asset outside of the blockchain.

9. The computer-implemented system of claim 7, wherein the operations comprise:

receiving a configuration instruction sent by the first blockchain member, wherein the configuration instruction specifies an adjustment to an additional maximum trusted asset limit for an additional blockchain asset type; and adjusting the additional maximum trusted asset limit based on the configuration instruction.

10. The computer-implemented system of claim 9, wherein the additional maximum trusted asset limit is global information recorded in a blockchain ledger of the blockchain.

11. The computer-implemented system of claim 9, wherein the additional maximum trusted asset limit is recorded in the specified smart contract in the blockchain, and wherein the asset transfer request is initiated in response to an operation to invoke the specified smart contract.

12. The computer-implemented method of claim 1, comprising:

detecting, by the first blockchain node, a second asset transfer request to transfer a second blockchain asset from the blockchain wallet of the first user to a second blockchain member in the blockchain network, wherein the second blockchain asset is of the specified blockchain asset type and is issued by the given anchor in the blockchain;

determining, by the first blockchain node, that there is a second maximum trusted asset limit configured by the second blockchain member for the given anchor and that corresponds to the specified blockchain asset type, wherein the second maximum trusted asset limit indicates the second blockchain member's trust in the given anchor for converting the second maximum trusted asset limit of assets of the specified blockchain asset type into a second off-chain asset;

in response to determining by the first blockchain node that the second maximum trusted asset limit is configured:

determining, by the first blockchain node, that the second maximum trusted asset limit is not exceeded; and in response to determining that the second maximum trusted asset limit is not exceeded, applying, by the first blockchain node, the second asset transfer request to the second blockchain asset.

13. The computer-implemented method of claim 12, wherein determining, by the first blockchain node, that the second maximum trusted asset limit is not comprises:

determining a first amount of the second blockchain asset to be transferred to the second blockchain member;

determining a second amount of a third blockchain asset that is held by the second blockchain member;

comparing (i) a sum of the first amount of the second blockchain asset and the second amount of the third blockchain asset with (i) the second maximum trusted asset limit; and determining, based on the comparing, that the sum exceeds the second maximum trusted asset limit.

14. The computer-implemented method of claim 1, further comprising determining a route for transferring the given blockchain asset from the blockchain wallet of the first user to the given blockchain member through respective nodes of one or more intermediate blockchain members based on configured maximum asset trust limits for the one or more intermediate blockchain members and an amount of the given blockchain asset.

* * * * *

UNITED STATES PATENT AND TRADEMARK OFFICE
CERTIFICATE OF CORRECTION

PATENT NO. : 11,328,303 B2
APPLICATION NO. : 16/424991
DATED : May 10, 2022
INVENTOR(S) : Hu et al.

It is certified that error appears in the above-identified patent and that said Letters Patent is hereby corrected as shown below:

In the Claims

In Column 22, Line 34, Claim 13, delete "not comprises:" and insert -- not exceeded comprises: --, therefor.

Signed and Sealed this
Twelfth Day of July, 2022

Katherine Kelly Vidal
*Director of the United States Patent and Trademark Office*